(12) United States Patent
Lanfranchi

(10) Patent No.: US 6,808,382 B2
(45) Date of Patent: Oct. 26, 2004

(54) DEVICE FOR CONVEYING AND CHECKING CONTAINERS, IN PARTICULAR PREFORMS

(76) Inventor: Lino Lanfranchi, Via caduti del Lavoro, 35 I-43044, Collecchio (IT)

( * ) Notice: Subject to any disclaimer, the term of this patent is extended or adjusted under 35 U.S.C. 154(b) by 232 days.

(21) Appl. No.: 10/204,963

(22) PCT Filed: Dec. 13, 2000

(86) PCT No.: PCT/IT00/00513
§ 371 (c)(1),
(2), (4) Date: Aug. 26, 2002

(87) PCT Pub. No.: WO01/68338
PCT Pub. Date: Sep. 20, 2001

(65) Prior Publication Data
US 2003/0008029 A1 Jan. 9, 2003

(30) Foreign Application Priority Data
Mar. 15, 2000 (IT) ...................................... PR2000A0017

(51) Int. Cl.$^7$ .............................................. B29C 31/08
(52) U.S. Cl. ......................... 425/169; 209/523; 198/812
(58) Field of Search ............................... 425/169, 522, 425/534; 198/812; 209/523

(56) References Cited

U.S. PATENT DOCUMENTS

| | | | | |
|---|---|---|---|---|
| 4,693,375 A | * | 9/1987 | Schweers | 425/534 |
| 5,591,462 A | * | 1/1997 | Darling et al. | 425/534 |
| 5,975,880 A | * | 11/1999 | Takada et al. | 425/534 |
| 6,130,536 A | * | 10/2000 | Powell et al. | 425/169 |
| 6,186,760 B1 | * | 2/2001 | Latham | 425/170 |
| 6,189,701 B1 | * | 2/2001 | Winter | 209/523 |
| 6,422,379 B1 | * | 7/2002 | Zoppas | 425/534 |

FOREIGN PATENT DOCUMENTS

| | | | | | |
|---|---|---|---|---|---|
| DE | 2604861 A | * | 8/1977 | ........... | B29C/17/02 |
| DE | 19737527 A1 | * | 3/1999 | ........... | B29C/49/80 |
| GB | 1480322 A | * | 7/1977 | ........... | B29C/49/16 |

* cited by examiner

Primary Examiner—Robert B. Davis
(74) Attorney, Agent, or Firm—Shlesinger Fitzsimmons & Shlesinger

(57) ABSTRACT

A device (1) for conveying and checking containers, in particular preforms, comprises an infeed and accumulation section (2) for containers arriving from a forming station and a carrousel (3) located downstream of the infeed and accumulation section (2) in the direction of feed of the containers, to feed the containers through a sequence of checking stations (4) disposed in the periphery of carrousel (3). The infeed section is intermittently supplied with containers by the forming station while the carrousel (3) turns continuously. An endless chain (5) extends along a path defined by driving gearwheels (6) which partially overlaps the infeed and accumulation section (2) and the circular trajectory of the carrousel (3). A first and second driving gearwheels (9a, 9b) positioned along the path followed by the endless chain (5) are mobile to compensate the variations in the length of a delivery section and a return section of the chain (5).

2 Claims, 1 Drawing Sheet

US 6,808,382 B2

DEVICE FOR CONVEYING AND CHECKING CONTAINERS, IN PARTICULAR PREFORMS

Figure 1:
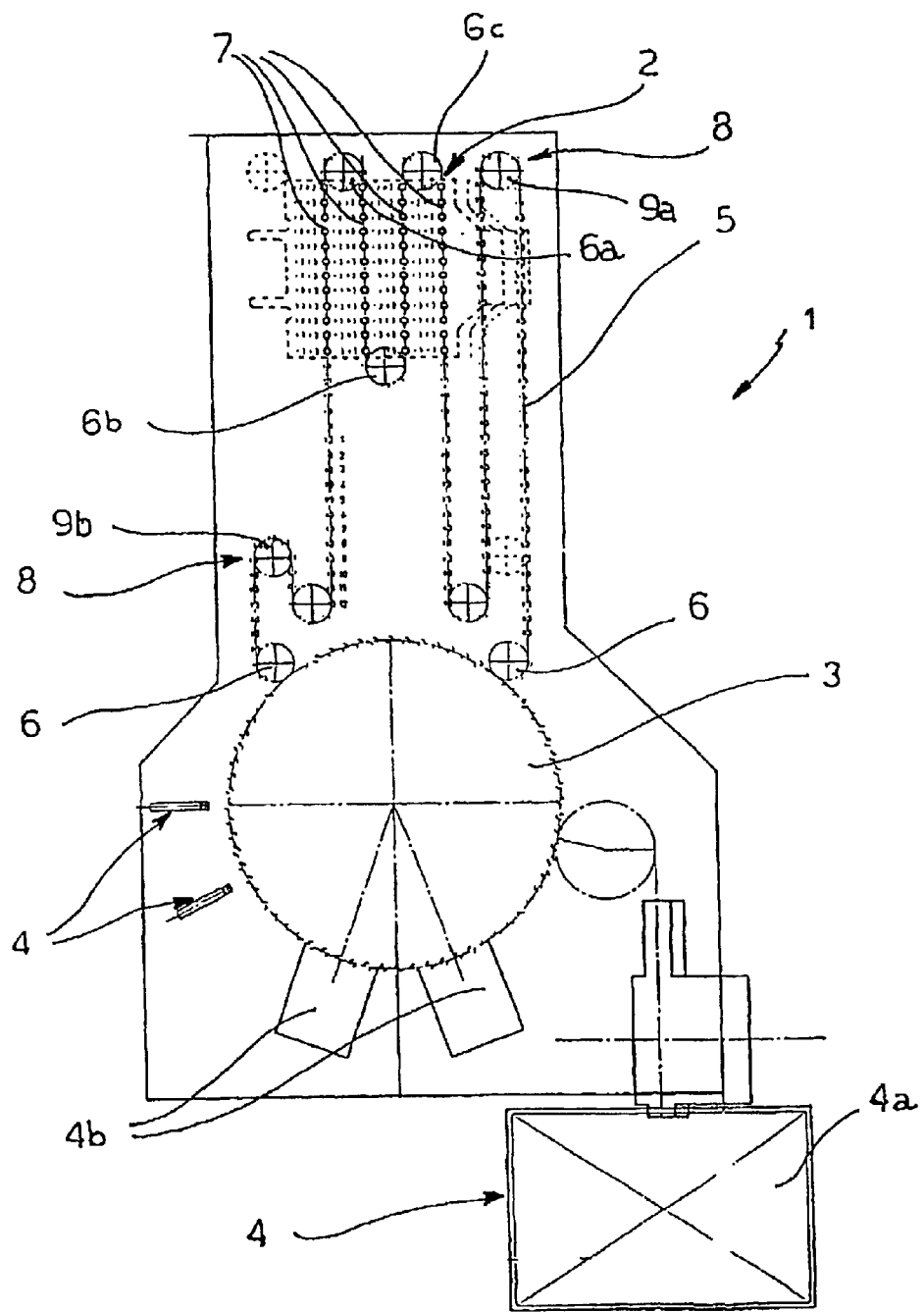

This application is a 371 of PCT/IT00/00513 filed Dec. 13, 2000.

TECHNICAL FIELD AND BACKGROUND ART

The present invention relates to a device for checking containers, in particular preforms.

The device is included in the sector of bottling systems, substantially at the start of the production line.

As is known, plastic bottles for bottling are made by means of several successive processes which include, firstly, the formation of the so-called preforms and, secondly, preform blowing to obtain the finished bottle.

The preforms are cylindrical containers in which the mouth, neck and threaded portion of the neck already have their final dimensions, whilst the bottle body is cylindrical and has substantially the same diameter as the neck. The preforms are then transferred to a blowing machine, in which they are inserted in a mould with the final shape and dimensions of the bottle.

The preforms are formed by moulding with intermittent production, using a mould with a set of cavities arranged in rows. The mould is tilted to unload a row of preforms onto a conveyor which links the forming station and the subsequent blowing station.

The teachings of prior art have some important disadvantages. Firstly, the preforms moulded in rows inside the mould are tipped loose onto the conveyor belt. Then they are set upright again and arranged in a row before entering the blowing station.

This procedure involves the use of intermediate devices between the forming station and the blowing station, which increase production times and complicate plant layout.

Secondly, during the stage in which they are tipped onto the conveyor, the preforms are subject to impacts and damage which may compromise the good condition of the final bottle and, as a result, give rise to rejects which affect the production cycle of the entire plant.

Moreover, in known bottling plant, the preforms are transferred directly from the forming machine to the blowing machine without intermediate checks on the good condition of the preforms and production uniformity.

DISCLOSURE OF INVENTION

The aim of the present invention is, therefore, to overcome the above-mentioned disadvantages by providing a device for checking containers, in particular preforms, which picks up the preforms arranged in rows and transfers them to successive stations, in particular to the forming station, avoiding any damage and superfluous transfers and rearrangement of the preforms.

Another aim of the present invention is to provide a device for checking preforms which allows adaptation between the forming station intermittent operation and the continuous operation of the plant downstream of the forming station.

These aims are fulfilled by the device for checking containers, in particular preforms, disclosed whose characteristics are described in the claims herein and, in particular, characterised in that it comprises an infeed and accumulation section for the containers loaded alternately from a forming station, a continuously rotating carrousel and connecting means inserted between the infeed and accumulation section and the carrousel and having means which adjust the alternate operation of the infeed section relative to the continuous operation of the carrousel.

BEST MODE FOR CARRYING OUT THE INVENTION.

This and other characteristics are more clearly illustrated in the detailed description which follows, with reference to the accompanying drawing, which illustrate a preferred embodiment without limiting the scope of application, and in which:

FIG. 1 is a top view of a device made in accordance with the present invention.

With reference to the accompanying drawing, the numeral 1 indicates as a whole a device for checking containers, in particular preforms.

The preforms are made by moulding in a forming station which is not illustrated, being of the substantially known type. The forming station has a mould in which the preforms are made in a plurality of rows. The preforms are also unloaded from the mould with the mouth facing downwards.

The forming station has alternating operation, since the preforms are unloaded from the mould one row at a time, whilst the forming stage is completed on the other rows. The figure illustrates a diagram of a possible layout of the device 1 in which the numeral 2 denotes an feeding and accumulation section for containers from the forming station. The numeral 3 indicates a carrousel which rotates continuously, feeding the containers through a sequence of checking stations 4. In particular, there is a station 4a which checks the weight of the preforms and several reject stations 4b in which faulty preforms are rejected.

The preforms are picked up from the forming station, inserted in the feeding and accumulation station 2 and transferred to the carrousel 3. This transfer is performed by an endless chain 5 extending along a path defined by driving gear wheels 6.

The path followed by the chain 5 partially overlaps the circular trajectory of the carrousel 3 for preform transfer.

Moreover, the endless chain 5 overlaps the container feeding and accumulation section 2, defining four container reception rows 7, between three driving gear wheels 6a, 6b and 6c.

Each row 7 receives a row of preforms from the mould in the forming station. During loading of the reception rows 7 in the feeding and accumulation section, the section of chain which defines the rows remains stationary between the driving gear wheels 6a, 6b and 6c.

As soon as the four rows 7 are complete, the corresponding section of chain moves forward while four new empty rows 7 are filled.

The endless chain 5 constitutes connecting means between the feeding and accumulation section 2 and the carrousel 3 located downstream of the feeding section in the direction of container feed. These means comprise means 8 which adjust the alternate operation of the forming station relative to the continuous operation of the carrousel. These adjusting means 8 are designed to guarantee continuous sliding of the chain 5 in the section which overlaps the trajectory of the carrousel 3.

For this purpose, the adjusting means 8 comprise a first and a second driving gear wheels 9a and 9b. The first driving gear wheel 9a is positioned along the path followed by the endless chain 5 on the section which passes from the feeding and accumulation section 2 to the carrousel 3, whilst the second driving gear wheel 9b is positioned on the section which returns from the carrousel 3 to the feeding and accumulation section 2.

The first and second driving gear wheels 9a and 9b are mobile, adjusting the variations in the length of the delivery and return section. In particular, the driving gear wheels move parallel with the chain in the two sections, in the direction indicated in the figure. Obviously, whilst the first driving gear wheel moves towards the carrousel 3 to compensate the reduction in the length of the delivery section of the chain 5, the second driving gear wheel 9b moves away from the carrousel 3 to compensate the increase in the length of the return section of the chain 5.

As soon as the four rows 7 of the feeding and accumulation section are complete, the first and second driving gear wheels 9a and 9b invert their motion. The preforms are transferred from the forming station to the chain 5, with the mouths facing downwards, and this position is maintained along the preform conveyor throughout the device 1. For this reason, the chain 5 comprises retaining means which receive the containers from the forming station and feed them along the delivery section from the feeding and accumulation section to the carrousel, keeping the containers with the mouths facing downwards. The containers are then transferred from the chain to the carrousel.

What is claimed is:

1. A device (1) for conveying and checking containers, in particular preforms, that comprises: an feeding and accumulation section (2) for the containers arriving from a container forming station, the feeding and accumulation section being loaded intermittently from the forming station; a carrousel (3) which rotates continuously, located downstream of the feeding and accumulation section in the direction of container feed, to feed the containers through a sequence of checking stations (4); connecting means located between the feeding and accumulation section and the carrousel and having means (8) for adjusting the alternate operation of the feeding and accumulation section relative to the continuous operation of the carousel, the connecting means comprise an endless chain (5) extending along a path defined by driving gear wheels (6), the path partially overlapping the circular trajectory of the carrousel; characterized in that the adjusting means (8) comprise a first and a second driving gear wheels (9a, 9b) arranged along the path followed by the endless chain, located respectively on the delivery section of the feeding and accumulation section, the first and second driving gear wheels being mobile to compensate the variations in the length of the delivery and return sections.

2. The device according to claim 1, characterized in that the chain comprises retaining means which receive the containers from the forming station and feed them along the delivery section from the feeding and accumulation section to the carrousel, the containers being positioned with mouths facing downwards.

* * * * *